United States Patent [19]

Meuer et al.

[11] Patent Number: 5,259,481

[45] Date of Patent: Nov. 9, 1993

[54] CENTRAL-LUBRICATION ASSEMBLY

[75] Inventors: Johannes Meuer; Dieter Todtenhaupt; Dieter Schönherr, all of Berlin, Fed. Rep. of Germany

[73] Assignee: Willy Vogel AG, Berlin, Fed. Rep. of Germany

[21] Appl. No.: 819,339

[22] Filed: Jan. 9, 1992

[30] Foreign Application Priority Data

Jan. 10, 1991 [DE]  Fed. Rep. of Germany ........ 4100725

[51] Int. Cl.$^5$ .............................................. F16N 27/00
[52] U.S. Cl. ................................... 184/7.4; 184/6.28; 184/7.2; 184/45.1; 222/130
[58] Field of Search ........................ 184/27.1, 7.4, 6.28, 184/6.27, 7.2, 45.1; 222/325, 333, 256, 872, 130, 135, 142.3

[56] References Cited

U.S. PATENT DOCUMENTS

| 1,497,575 | 6/1924 | Menge | 222/130 |
| 2,060,484 | 11/1936 | Barrett | 222/130 |
| 2,777,610 | 1/1957 | Fox et al. | 222/130 |
| 3,179,292 | 4/1965 | Terry | 222/325 |
| 3,987,869 | 10/1976 | Bowers | 184/27.1 |
| 5,038,892 | 8/1991 | Maloney | 184/27.1 |

*Primary Examiner*—Ira S. Lazarus
*Assistant Examiner*—Alan Cariaso
*Attorney, Agent, or Firm*—Mark P. Stone

[57] ABSTRACT

A central-lubrication assembly, instead of a refillable lubricant reservoir there are two lubricant cartridges (8, 9) which are equipped with follow-up pistons (17, 18) and one of which serves for feeding a lubricant pump (3), while the other is designed as a replacement cartridge.

11 Claims, 1 Drawing Sheet

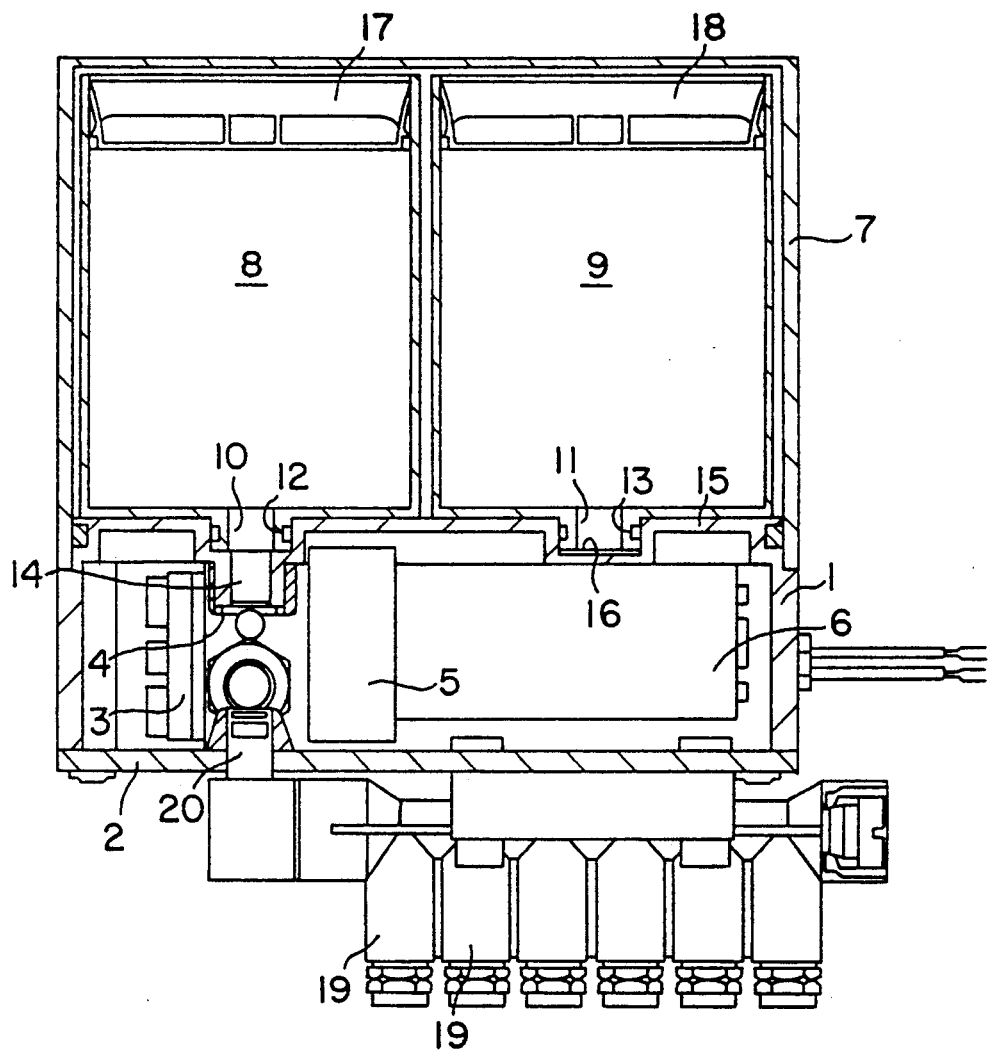

CENTRAL-LUBRICATION ASSEMBLY

BACKGROUND OF THE INVENTION

The invention relates to a central-lubrication assembly for vehicles, with a lubricant pump, with a lubricant reservoir and with a connecting piece connecting the lubricant pump to a feedline to a plurality of lubricant distributors and having a plurality of lubricant channels and at least one pressure-relief valve, the lubricant pump being arranged underneath a carrier which has a mounting for the lubricant reservoir.

DE-B 1,184,659 makes known a central-lubrication assembly of the foregoing type, in which the lubricant reservoir has to be refilled at more or less regular intervals, and furthermore, cleaned occasionally. The refilling is not only complicated, but care must also be taken, during the refilling, to ensure that no dirt particles enter the lubricant reservoir, since they can lead to malfunctions in the lubricant distributors. In large vehicles used by professional drivers and where pools are concerned, there are no difficulties in allowing for the factors described. However, the same does not apply accordingly, or at least not to the same extent, to the sector of centrally lubricated light trucks which are mainly driven by technically untrained personnel.

SUMMARY OF THE INVENTION

The object on which the invention is based is to provide a central-lubrication assembly of the type under consideration, in which the problems which can occur during the refilling of a lubricant reservoir are eliminated. This object is achieved, according to the invention, in that the carrier is equipped with mountings for two lubricant cartridges, one of which is connected to the lubricant pump via a passage in the carrier, while the other forms a reserve cartridge.

The central-lubricating assembly according to the invention affords the advantage that it avoids the need for refilling and cleaning a lubricant reservoir and, instead, an exchange of lubricant cartridges, which does not present even laymen with the least difficulties, is merely necessary in each case.

BRIEF DESCRIPTION OF THE DRAWING

Further details and features of the invention emerge from the following description of an exemplary embodiment illustrated in the accompanying drawing.

DESCRIPTION OF THE BEST MODE FOR CARRYING OUT THE INVENTION

In the figure, 1 is a housing which is closed by means of a cover 2 and in which are arranged a gear pump 3 and the drive motor 6 connected to this via a connecting piece 4 and an intermediate piece 5 and belonging to a central-lubrication assembly. Above the housing 1, two lubricant cartridges 8 and 9 filled with fluid grease are accommodated under a cowl 7 made of transparent material. The two lubricant cartridges 8 and 9 have mouthpieces 10 and 11, respectively, which are inserted into recesses 12 and 13, respectively, forming mountings for the lubricant cartridges. Whereas the lubricant cartridge 8 is open and is connected to the connecting piece 4 via a passage 14 in a carrier 15 formed by the upper wall of the housing 1, the cartridge 9 is closed, the closure being formed by a foil 16 covering its mouthpiece 11.

Each of the two cartridges 8 and 9 filled with fluid grease is equipped with a follow-up piston 17 and 18, respectively, which, during the suction of the fluid grease out of the respectively connected cartridge, prevents a funnel formation in the lubricant reservoir.

As a result of the transparent design of the cowl 7, it is easily possible to see from the position of the follow-up piston 17 when the lubricant reservoir 8 is empty. In this case, the user merely has to exchange it for the lubricant reservoir 9 and, at the next opportunity, insert a new reserve lubricant reservoir in place of the latter.

19 denotes a plurality of lubricant distributors which are connected via a feedline 20 to the intermediate piece 4 having a plurality of lubricant channels.

We claim:

1. A central-lubrication assembly for vehicles, with a lubricant pump, a lubricant reservoir comprising at least two lubricant containers, and with a connecting piece connecting the lubricant pump to a feedline to a plurality of lubricant distributors and having a plurality of lubricant channels and at least one pressure-relief valve, the lubricant pump being arranged underneath a carrier which has a mounting for the lubricant reservoir, the carrier (15) being equipped with mountings (12, 13) for said at least two lubricant containers (8, 9), one (8) of said lubricant containers being connected to the lubricant pump (3) via a passage (14) in the carrier (15), while the other (9) of said at least two lubricant containers is provided as a reserve lubricant container.

2. The central-lubrication assembly as claimed in claim 1 including a housing (1) for receiving therein said lubricant pump (3) and said connecting piece (4), said housing having an upper wall forming said carrier (15) for said lubricant reservoir positioned thereabove.

3. The central-lubrication assembly as claimed in claim 1, wherein the lubricant containers (8, 9) are arranged under a cowl (7) made of transparent material.

4. The central-lubrication assembly as claimed in claim 1, wherein the lubricant containers (8, 9) are equipped with follow-up pistons (17, 18).

5. The central-lubrication assembly as claimed in claim 1, wherein the lubricant pump (3) is designed as a gear pump.

6. The central-lubrication assembly as claimed in claim 2, wherein the lubricant containers (8, 9) are arranged under a cowl (7) made of transparent material.

7. The central-lubrication assembly as claimed in claim 2, wherein the lubricant containers (8, 9) are equipped with follow-up pistons (17, 18).

8. The central-lubrication assembly as claimed in claim 3, wherein the lubricant containers (8, 9) are equipped with follow-up pistons (17, 18).

9. The central-lubrication assembly as claimed in claim 2, wherein the lubricant pump (3) is designed as a gear pump.

10. The central-lubrication assembly as claimed in claim 3, wherein the lubricant pump (3) is designed as a gear pump.

11. The central-lubrication assembly as claimed in claim 4, wherein the lubricant pump (3) is designed as a gear pump.

* * * * *